United States Patent
Kobayashi

(10) Patent No.: US 7,821,163 B2
(45) Date of Patent: *Oct. 26, 2010

(54) ELECTRIC PANEL

(75) Inventor: Hiroshi Kobayashi, Saitama (JP)

(73) Assignee: Pioneer Corporation, Tokyo (JP)

( * ) Notice: Subject to any disclaimer, the term of this patent is extended or adjusted under 35 U.S.C. 154(b) by 41 days.

This patent is subject to a terminal disclaimer.

(21) Appl. No.: 12/108,096

(22) Filed: Apr. 23, 2008

(65) Prior Publication Data

US 2008/0231415 A1 Sep. 25, 2008

Related U.S. Application Data

(63) Continuation of application No. 11/077,230, filed on Mar. 11, 2005, now Pat. No. 7,375,439.

(30) Foreign Application Priority Data

Mar. 17, 2004 (JP) .............................. 2004-075878

(51) Int. Cl.
*H02H 11/00* (2006.01)
*B60L 1/00* (2006.01)
*A47B 95/02* (2006.01)
*A47B 96/00* (2006.01)

(52) U.S. Cl. .................. 307/326; 307/10.1; 312/319.5; 312/270.1

(58) Field of Classification Search ............... 307/10.1, 307/326; 312/319.5, 319.6, 319.7, 319.8, 312/270.2, 317.3, 248

See application file for complete search history.

(56) References Cited

U.S. PATENT DOCUMENTS

| 4,703,316 | A | | 10/1987 | Sherbeck |
| 5,375,805 | A | * | 12/1994 | Sudak et al. ............. 248/311.2 |
| 6,384,875 | B2 | | 5/2002 | Bertagna |
| 6,529,122 | B1 | * | 3/2003 | Magnussen et al. ...... 340/407.2 |
| 6,575,542 | B2 | * | 6/2003 | Shimajiri ..................... 312/332 |
| 6,754,070 | B2 | | 6/2004 | Chen |
| 6,994,409 | B2 | * | 2/2006 | Godlewski .................. 312/297 |
| 7,138,727 | B2 | | 11/2006 | Hein et al. |
| 7,226,112 | B2 | * | 6/2007 | Ward ........................ 296/146.8 |
| 7,375,439 | B2 | * | 5/2008 | Kobayashi ................. 307/10.1 |

FOREIGN PATENT DOCUMENTS

| JP | 61-118827 A | 6/1986 |
| JP | 04-109331 A | 4/1992 |
| JP | 06-095803 A | 4/1994 |
| JP | 07-111073 A | 4/1995 |
| JP | 10-181858 A | 7/1998 |
| JP | 11-297058 A | 10/1999 |
| JP | 2000-105990 A | 4/2000 |
| JP | 2001-270390 A | 10/2001 |

* cited by examiner

*Primary Examiner*—Michael Rutland Wallis
(74) *Attorney, Agent, or Firm*—Foley & Lardner LLP

(57) ABSTRACT

A panel is provided on a front side of an electronic device. A driving unit opens and closes the panel. A position detecting unit detects whether the panel is open. An object detecting unit detects whether there is an object on the panel when the panel is open. A control unit controls the driving unit not to close the panel when there is an object on the panel.

14 Claims, 8 Drawing Sheets

ELECTRIC PANEL

CROSS-REFERENCE TO RELATED APPLICATIONS

The present application is a Continuation of U.S. application Ser. No. 11/077,230, filed Mar. 11, 2005, which is based upon and claims the benefit of priority from prior Japanese Patent Application No. 2004-75878, filed Mar. 17, 2004, the entire contents of which are incorporated herein by reference.

BACKGROUND OF THE INVENTION

1) Field of the Invention

The present invention relates to an electric panel of an electronic device that opens and closes when a recoding medium is set in or removed from a recording-medium loading slot of the electronic device.

2) Description of the Related Art

Conventional audiovisual electronic devices typically have an operation panel (hereinafter, "panel") with buttons for manual operation and a liquid crystal display, and a loading slot to set recording mediums such as mini discs (MDs), compact discs (CDs), and digital versatile discs or digital video discs (DVDs). However, in-car electronic devices such as car stereos or car navigation systems need to be compact enough to fit within a specified area. One approach is to provide the panel in front of the loading slot, such that the panel opens when a recording medium is to be set in the loading slot. FIGS. 1A to 1C are perspective views of an in-car electronic device 1 (hereinafter, "electronic device 1") with a panel 3 provided on a front side 2a of the electronic device 1. Playback devices 21a to 21c that playback MDs, CDs, or DVDs are located inside a device body 2 of the electronic device 1. The playback devices 21a to 21c have recording-medium loading slots 22a to 22c that are located at the front side 2a of the device body 2, behind the panel 3. The panel 3 is driven from a close position, as shown in FIG. 1A, to an open position, as shown in FIG. 1C, when setting or removing a recording medium. The bottom edge of the panel 3 slides toward the front, and a display surface 31a of the panel 3 tilts upward as shown in FIG. 1B, until the display surface 31a becomes substantially horizontal, as shown in FIG. 1C. As a result, the recording-medium loading slots 22a to 22c appear, so that a recording medium can be set or removed. After the recording medium is set or removed, the panel 3 closes automatically or by a user's instruction.

However, as the panel 3 protrudes outside when open, it can be a safety hazard in case of an accident. To address this problem, Japanese Patent Application Laid Open No. 2001-270390 discloses a technology in which a warning sound is emitted when the panel 3 is open while the car is running, to urge a driver (passenger) to close the panel. However, the hazard remains unresolved if the driver ignores the sound.

Another conventional technology disclosed in Japanese Patent Application Laid Open No. 2000-105990 automatically closes the panel 3 after a predetermined time duration from when the car starts running, but causes the panel 3 to remain open if the car is not running. However, the users sometimes put object, such as CD cases or coffee cups, on the open panel 3. These objects fall off when the panel 3 closes automatically.

SUMMARY OF THE INVENTION

It is an object of the present invention to at least solve the problems in the conventional technology.

According to an aspect of the present invention, an electric panel includes a panel of an electronic device, wherein the panel is capable of moving between an open position and a close position; a driving unit that drives the panel between the open position and the close position; a position detecting unit that detects whether the panel is at the open position; an object detecting unit that detects whether there is an object on the panel when the position detecting unit detects that the panel is at the open position; and a control unit that controls the driving unit not to drive the panel from the open position when the object detecting unit detects an object on the panel.

According to another aspect of the present invention, an electric panel includes a panel of an electronic device that is installed in a movable body, wherein the panel is capable of moving between an open position and a close position; a driving unit that drives the panel between the open position and the close position; a position detecting unit that detects whether the panel is at the open position; an object detecting unit that detects whether there is an object on the panel when the position detecting unit detects that the panel is at the open position; a speed acquiring unit that acquires a speed of the movable body; and a control unit that controls the driving unit to drive the panel to the close position when the object detecting unit does not detect an object on the panel and the speed acquired by the speed acquiring unit is higher than a predetermined speed, and the driving unit not to drive the panel from the open position when the object detecting unit detects an object on the panel, even when the speed acquired by the speed-information acquiring unit is higher than the predetermined speed.

The other objects, features, and advantages of the present invention are specifically set forth in or will become apparent from the following detailed description of the invention when read in conjunction with the accompanying drawings.

DETAILED DESCRIPTION

Exemplary embodiments of the present invention will be described below with reference to accompanying drawings.

Figure 1A:
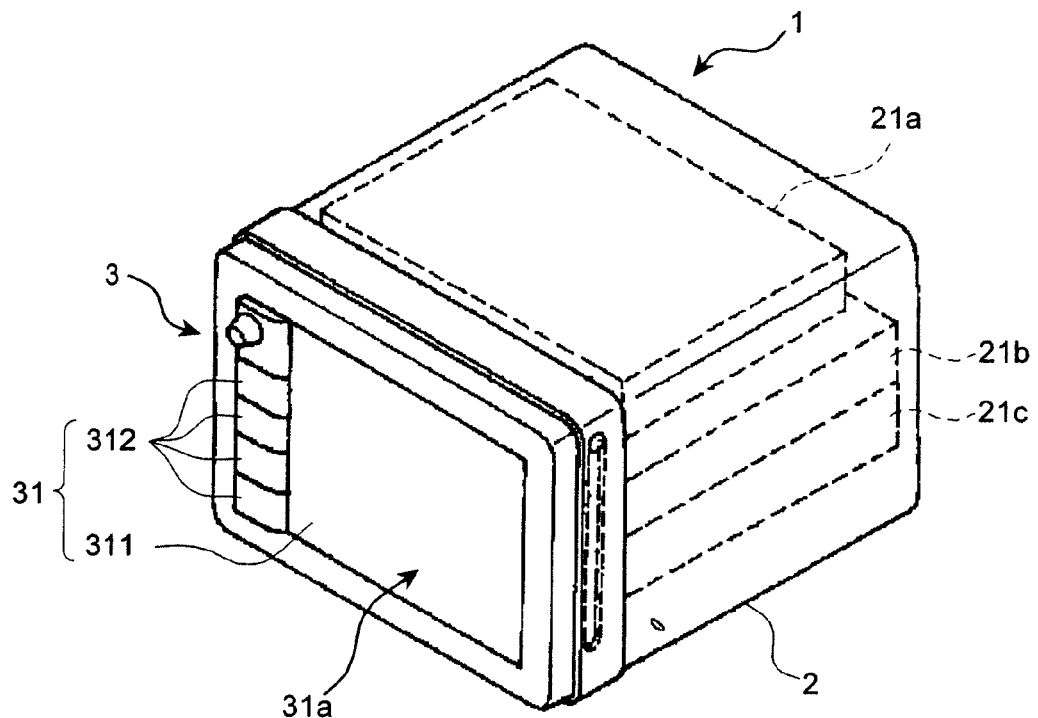
FIG. 1A is a perspective view of an in-car electronic device with a panel at a close position.
Figure 1B:
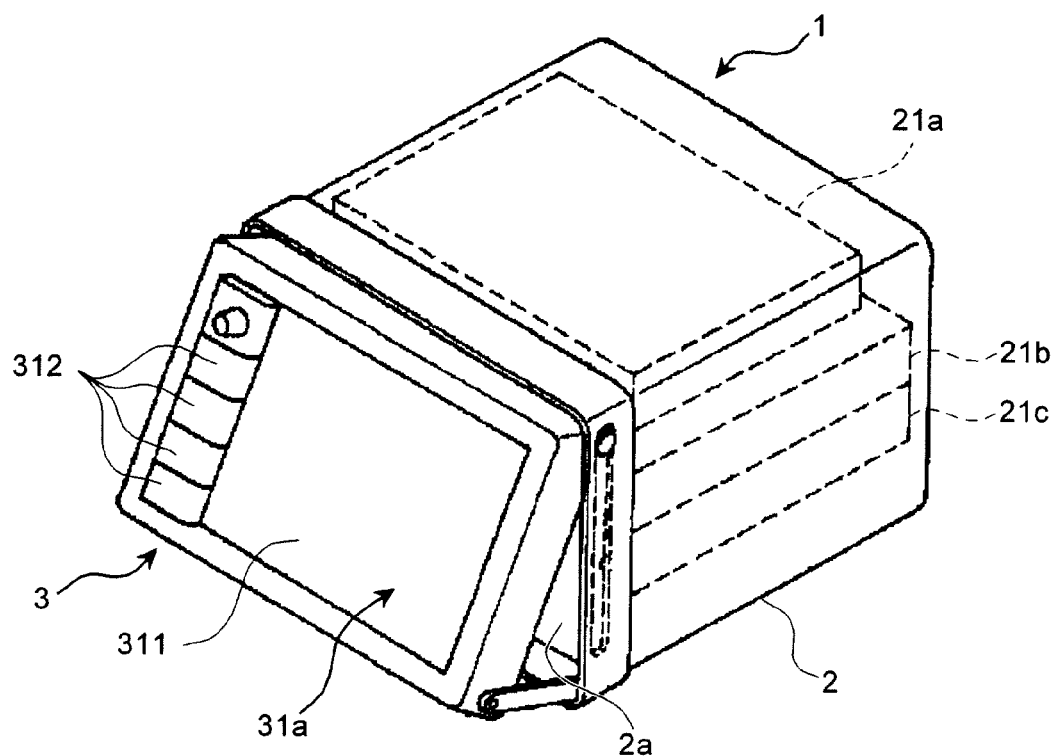
FIG. 1B is a perspective view of the in-car electronic device with a panel at a position between the close position and an open position.
Figure 1C:
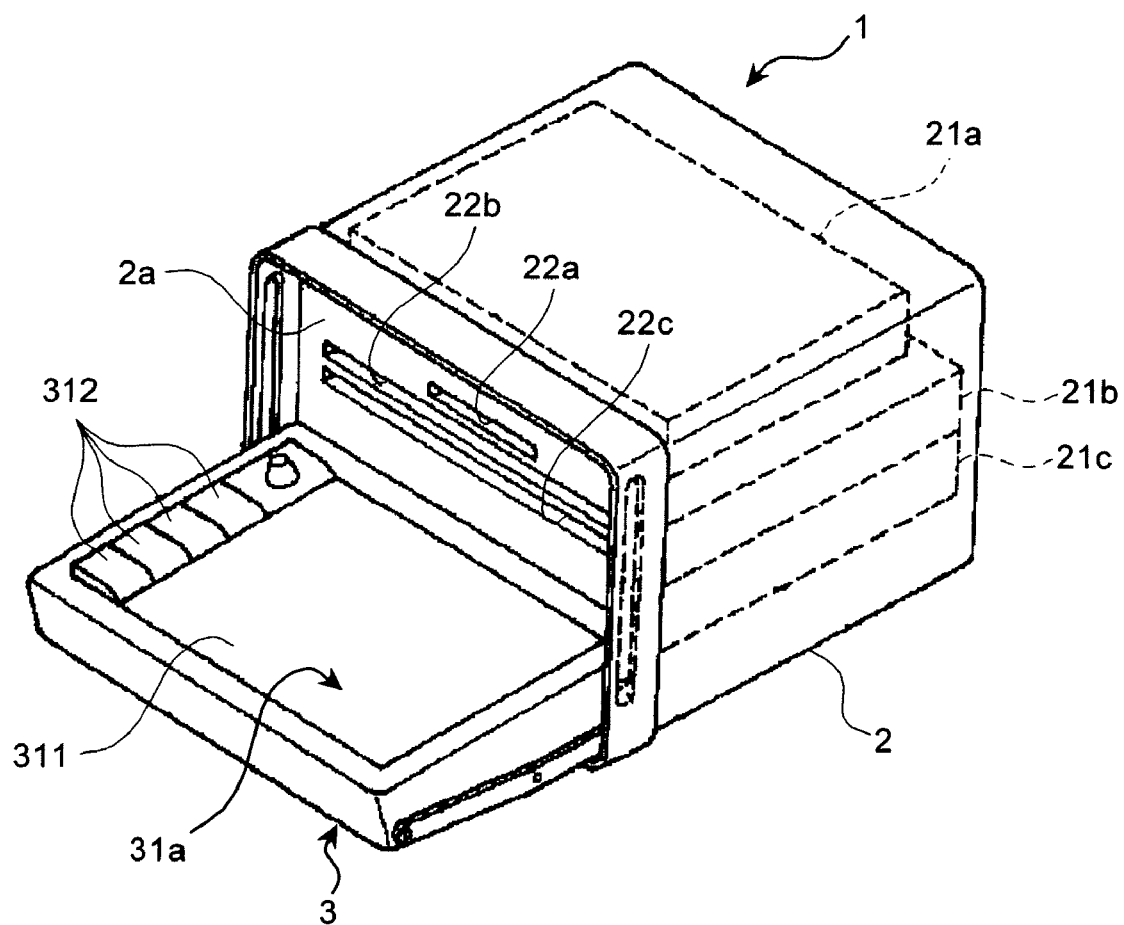
FIG. 1C is a perspective view of the in-car electronic device with a panel at the open position.
Figure 2:
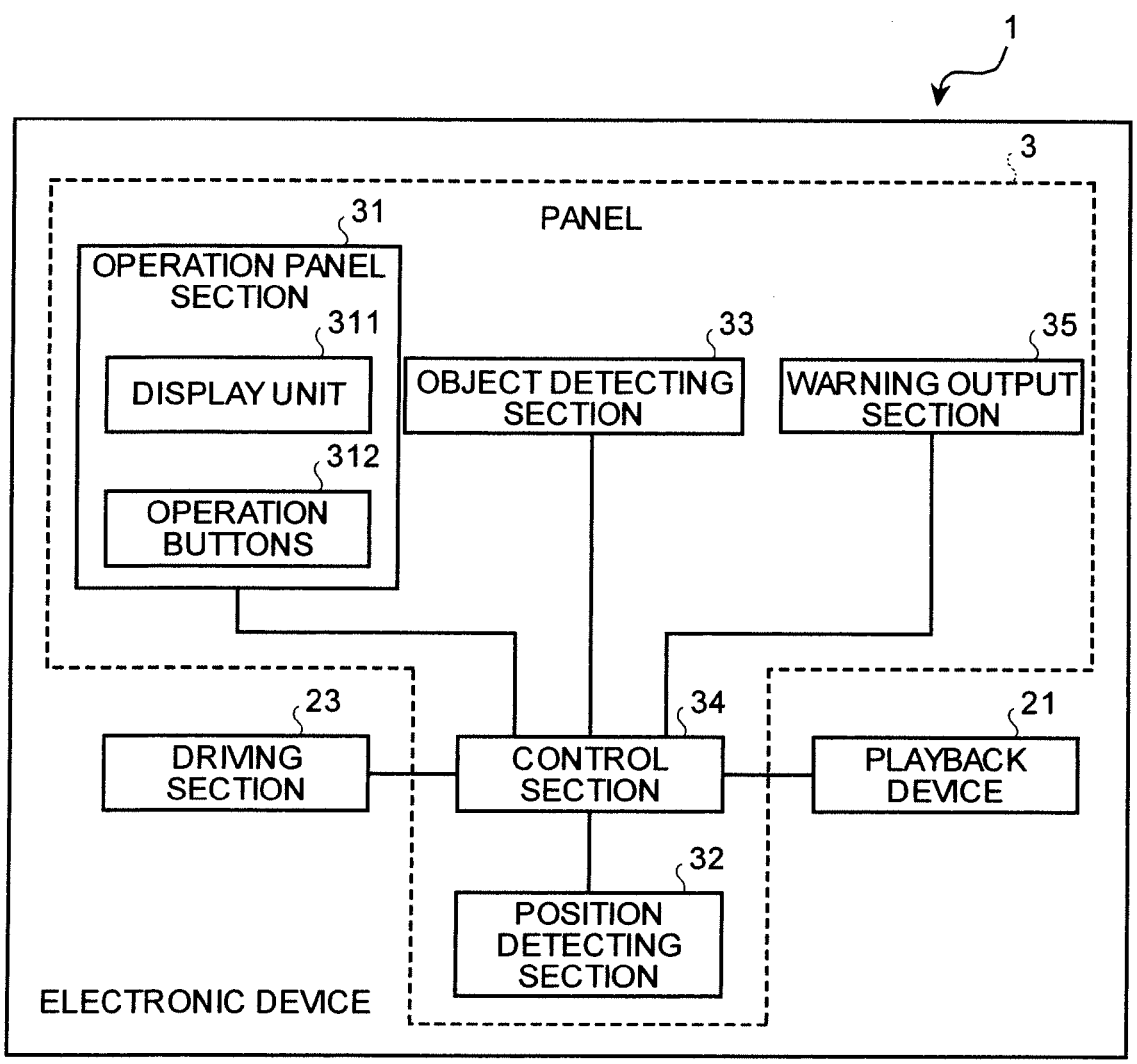
FIG. 2 is a schematic block diagram of an electronic device provided with an electric panel according to a first embodiment of the present invention.

A first embodiment according to the present invention is an electric panel that automatically closes after a predetermined time duration. FIG. 2 is a schematic block diagram of an electronic device 1 provided with a panel 3. As described with FIGS. 1A to 1C in the description of the related art, the panel 3 provided on a front side 2a of the electronic device 1 is used to operate the electronic device 1. Playback devices 21a to 21c that playback recording mediums such as MDs, CDs, or DVDs are located inside a device body 2 of the electronic device 1. The playback devices 21a to 21c have recording-medium loading slots 22a to 22c that are located at the front side 2a of the device body 2, behind the panel 3. The panel 3 is driven from a close position, as shown in FIG. 1A, to an open position, as shown in FIG. 1C, when setting or removing a recording medium.

A driving section 23 that drives the panel 3 is also provided in the device body 2. The driving section 23 includes a motor as a drive source, and a plurality of gears, arm members, and slide members combined together. The driving section 23 causes the bottom edge of the panel 3 to slide frontward, and a display surface 31a of the panel 3 to tilt upward, until the display surface 31a becomes substantially horizontal.

The panel 3 includes an operation panel section 31, a position detecting section 32, an object detecting section 33, a control section 34, and a warning output section 35. The electric panel according to the present invention refers to the panel 3 and the driving section 23 combined together.

The operation panel section 31 includes a display unit 311 that displays image information on a liquid crystal display, and operation buttons 312 that operate the electronic device 1. For example, if the electronic device 1 is a car stereo, the operation buttons 312 include buttons to turn on/off the power, to set/remove a recording medium, to playback a song, and so forth. The display unit 311 displays a present state of the electronic device 1 or information on a song being played. A surface of the panel 3 provided with the display unit 311 corresponds to the display surface 31a.

The position detecting section 32 detects a position of the panel 3, as to whether the panel is in the closed position or is in the open position. The position is detected by obtaining an angle between the display surface 31a and a horizontal surface, and acquiring an amount driven by the driving section 23. The detected position of the panel 3 is output to the control section 34. It is assumed that the panel 3 can move within a range as shown in FIGS. 1A to 1C, but can only stop at either the closed position shown in FIG. 1A or the open position shown in FIG. 1C.

Figure 3:
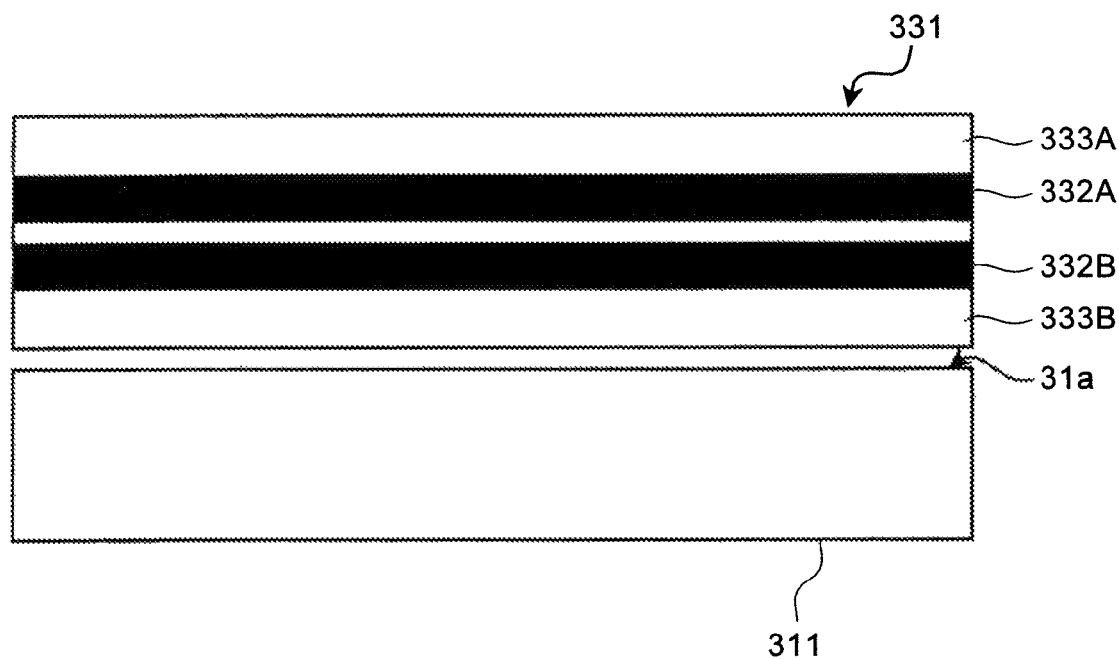
FIG. 3 is a schematic cross-section of a resistance-pressure-sensitive touch sensor.

The object detecting section 33 detects whether there is an object on the display surface 31a when the panel 3 is open, and outputs an object detection signal to the control section 34 when an object is detected. A resistance-pressure-sensitive touch sensor can be used as the object detecting section 33. FIG. 3 is a schematic cross-sectional view of the panel 3, when a resistance-pressure-sensitive touch sensor 331 is used as the object detecting section 33. The resistance-pressure-sensitive touch sensor 331 is attached to the display surface 31a of the display unit 311. The resistance-pressure-sensitive touch sensor 331 includes two transparent resistance layers, an upper resistance layer 332A and a lower resistance layer 332B, horizontally laid on the display surface 31a. For example, the upper resistance layer 332A and the lower resistance layer 332B are prepared by vapor depositing indium tin oxide (ITO) onto glass or polymeric films 333A and 333B. Voltage is applied to both the upper resistance layer 332A and the lower resistance layer 332B. When an object is placed on the resistance-pressure-sensitive touch sensor 331, the weight of the object causes the upper resistance layer 332A to contact the lower resistance layer 332B, and a resistance value (hereinafter, "resistance") is detected. The resistance-pressure-sensitive touch sensor 331 can detect whether there is an object on the display surface 31a from the resistance.

Figure 4:
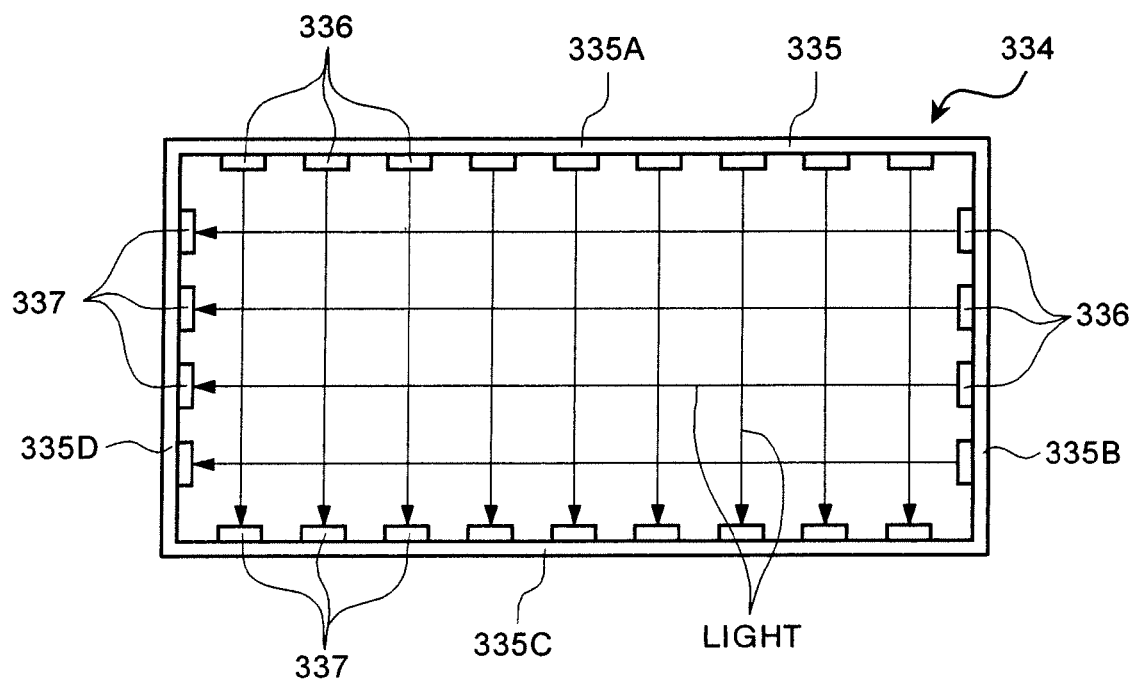
FIG. 4 is a schematic of a light-position-detecting touch sensor.

FIG. 4 is a schematic configuration of a light-position-detecting touch sensor 334. The light-position-detecting touch sensor 334 has a frame 335 that can be set on the front of the operation panel section 31. The frame 335 includes a plurality of detecting elements, each having a combination of a light-emitting element 336 and a light-sensitive element 337 opposing each other. For example, the light-emitting elements 336 are arranged at predetermined intervals along a side 335A of the frame 335, and the light-sensitive elements 337 are arranged along a side 335C opposite to the side 335A, at positions opposing the light-emitting elements 336 arranged along the side 335A. Furthermore, the light-emitting elements 336 are arranged at predetermined intervals along a side 335B of the frame 335, and light-sensitive elements 337 are arranged along a side 335D opposite to the side 335B, at positions opposing the light-emitting elements 336 arranged along the side 335B. Light is constantly emitted from the light-emitting elements 336, and each light-sensitive element 337 receives the light emitted from an opposing light-emitting element 336, thus forming a grid of lights on the operation panel section 31. If an object is placed on the display unit 311, the light is blocked from reaching the light-sensitive element 337. Therefore, when any of the light-sensitive elements 337 do not receive light, it can be determined that there is an object on the operation panel section 31. Furthermore, the frame 335 needs to be set at a position high enough on the front of the operation panel section 31, so that the operation buttons 312 do not block the emitted lights. FIG. 4 only schematically describes the frame 335, and does not represent a reduced scale of the frame 335. Moreover, an object placed on the panel 3 is to be distinguished from a temporary (momentary) contact of a user's finger and so forth on the panel 3. Therefore, the touch sensors 331 and 334 are preferably configured to wait for a predetermined time duration upon detecting resistance or light blockage, before sending out the object detection signal.

The control section 34 controls the entire electronic device 1 based on signals from the aforementioned sections. The function relative to the present invention is to control the panel 3 to open/close based on a predetermined standard. In the first embodiment, the control section 34 controls the driving section 23 not to close the panel 3 when an object is on the display surface 31a. The control section 34 also outputs a signal to the warning output section 35 that an object is detected.

Upon receiving the object detection signal, the warning output section 35 outputs a warning signal with a visual effect or a sound to urge a user to remove the object. For example, the warning signal can be a display on the display unit 311, light emitted from an indicator such as a light emitting diode (LED) that is irradiated or flashed at a position visible from the user, or a sound output from a speaker. When the display unit 311 or the speaker is used to output the warning, these components correspond to the warning output section 35.

Figure 5:
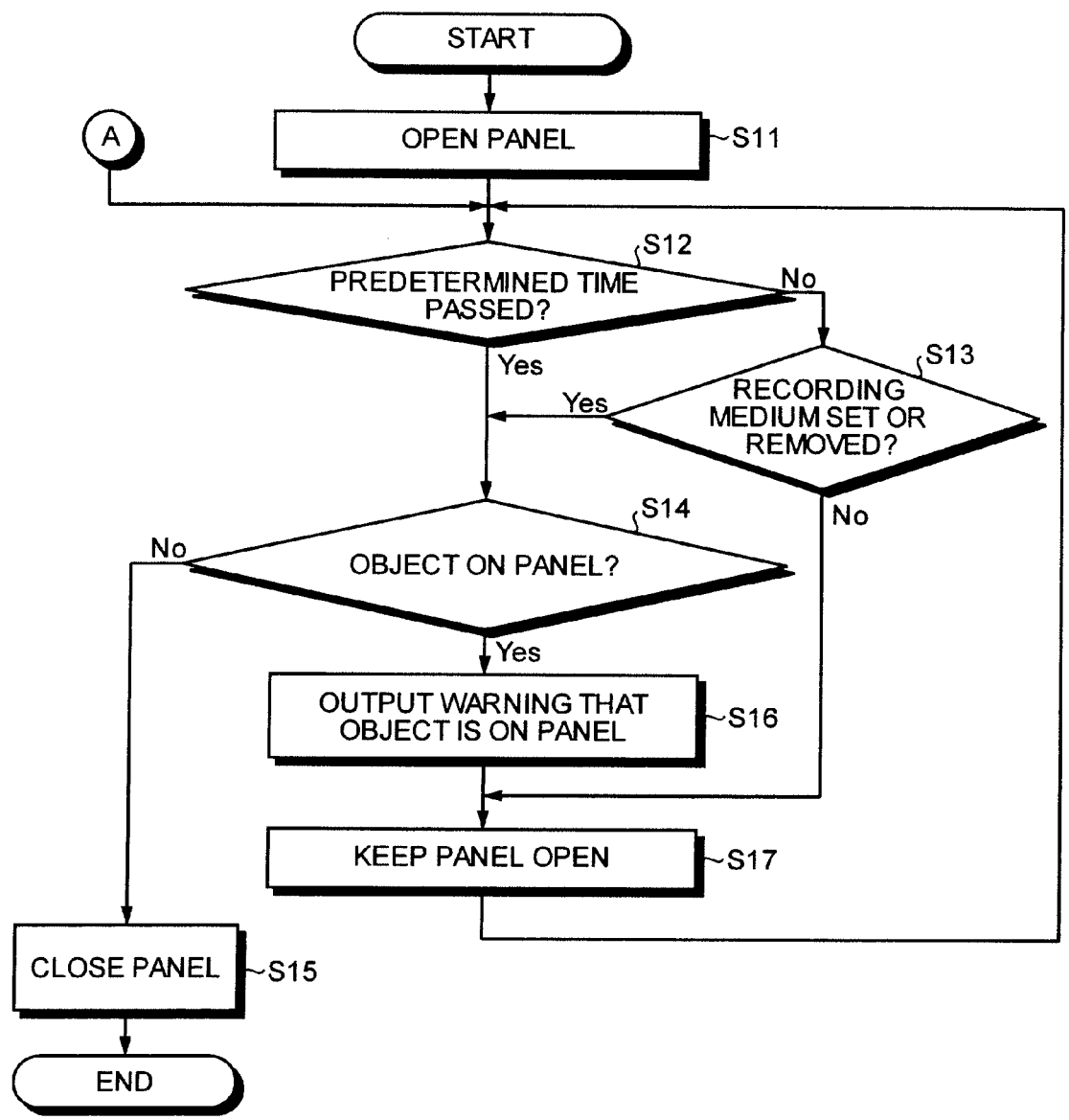
FIG. 5 is a flowchart of an example of an operation performed by the electric panel shown in FIG. 2.

FIG. 5 is a flowchart of an example of an operation performed by the electric panel. When a user inputs an instruction to open the panel 3 with the operation buttons 312, the control section 34 instructs the driving section 23 to open the panel 3, and the driving section 23 opens the panel 3 (step S11). Next, the control section 34 determines whether a predetermined time duration has passed after the panel 3 has opened (step S12), and if not ("No" at step S12), the control section 34 determines whether a recording medium has been set in or removed from the playback device 21 (step S13). If a recording medium has been set in or removed from the playback device 21 ("Yes" at step S13), or if a predetermined time duration has passed ("Yes" at step S12), the control section 34 determines whether there is an object on the panel 3 based on a signal of the object detecting section 33 (step S14). If the control section 34 determines that there is no object on the panel 3 ("No" at step S14), the control section 34 instructs the driving section 23 to close the panel 3. The driving section 23 closes the panel 3 (step S15), and the processing ends.

When the control section 34 determines that there is an object on the panel 3 ("Yes" at step S14), the control section 34 outputs a signal to the warning output section 35, and the warning output section 35 outputs a warning signal with a sound or a visual effect to urge a user to remove the object (step S16). The control section 34 instructs the driving section 23 to keep the panel 3 open (step S17), the system control returns to step S12, and repeats the above processing. When a recording medium has not been set in or removed from the playback device 21 ("No" at step S13), the panel 3 is kept open (step S17), the system control returns to step S12, and repeats the above processing.

In the above description, the touch sensor is the object detecting section 33 provided on the display surface 31a of the panel 3. However, the operation panel section 31 can function as a touch panel, such that the operation panel section 31 and the object detecting section 33 are combined into one section. As a result, the number of components in the electric panel can be reduced.

According to the first embodiment, if there is an object left on the display surface 31a when the panel 3 is open, the panel 3 does not automatically close although a predetermined time duration has passed or when a predetermined operation is completed. Therefore, the object is prevented from falling off. Moreover, when an object is detected on the display surface 31a, a warning is output to urge the user to remove the object. The warning not only notifies a user that an object is left on the panel 3, but also prevents the user from leaving objects on the panel 3.

An electric panel according to a second embodiment of the present invention is assumed to be provided on an in-car electronic device. The electric panel not only closes after a predetermined time duration, but also automatically closes when it is open while the car is running.

Figure 6:
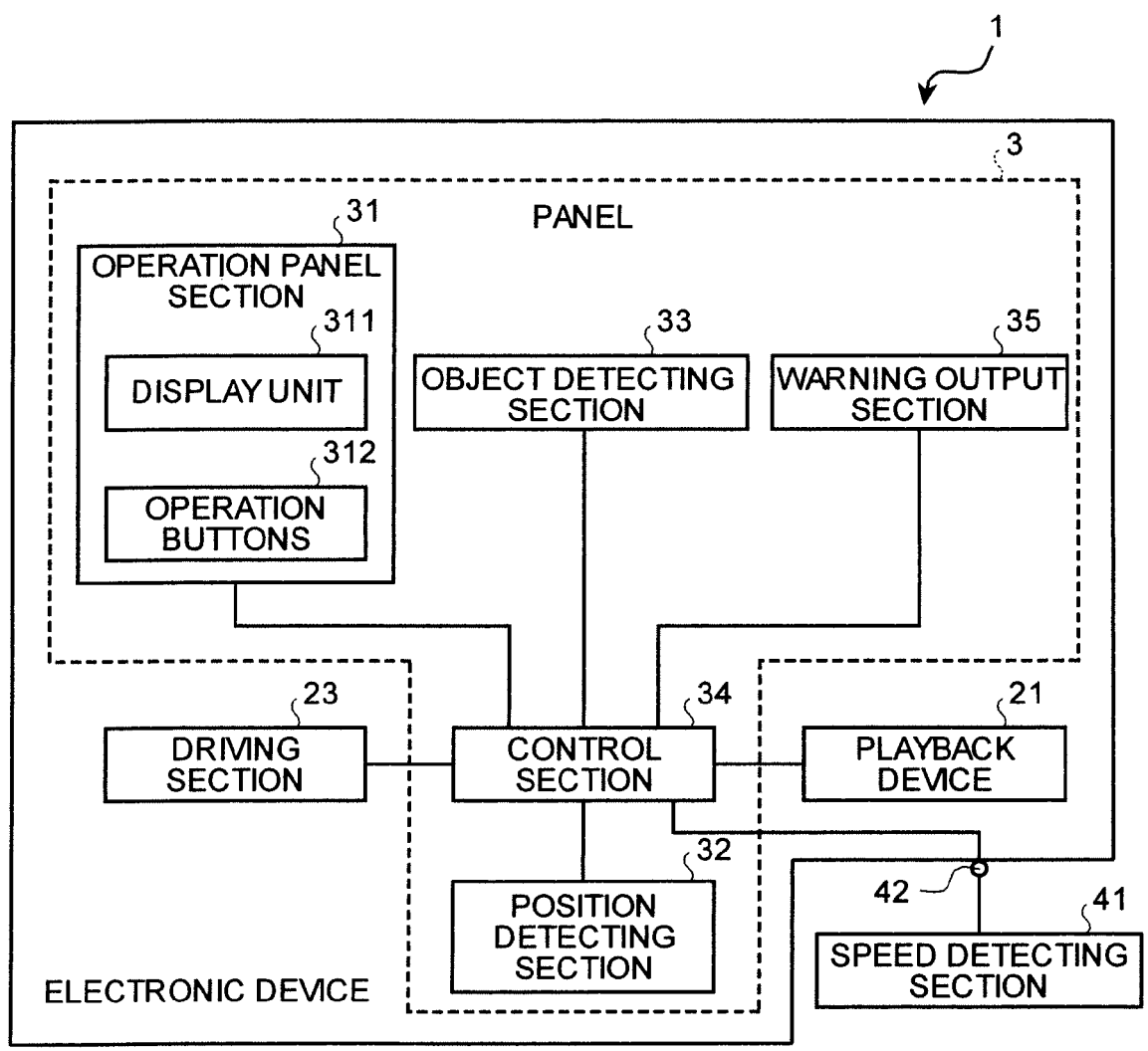
FIG. 6 is a schematic block diagram of an electronic device provided with an electric panel according to a second embodiment of the present invention.

FIG. 6 is a schematic block diagram of an electronic device 1 including a panel 3 according to the second embodiment of the present invention. The configuration shown in FIG. 6 is the same as that shown in FIG. 2, except that a speed detecting section 41 is connected to the electronic device 1. Common components are denoted by the same reference numerals and overlapping descriptions are omitted. The speed detecting section 41 detects the speed of the car installed with the electronic device 1. A speed sensor, a G (acceleration) sensor, or a speed pulse preinstalled in the car can be used as the speed detecting section 41. If the electronic device 1 is a car navigation system, a preinstalled GPS function can measure the speed, so the car navigation system itself can function as the speed detecting section 41. The car speed measured by the speed detecting section 41 is output to the control section 34. The speed detecting section 41 is connected to the control section 34 by a connection section 42 such as a connector. The connection section 42 corresponds to a speed acquiring unit in the claims.

When there is an object on the display surface 31a of the panel 3, the control section 34 controls the driving section 23 to keep the panel 3 open. Moreover, when the car starts running with an object placed on the display surface 31a, the control section 34 outputs a warning to urge a user (passenger) to remove the object. Specifically, the control section 34 outputs a signal to the warning output section 35 that there is an object on the display surface 31a.

Figure 7:
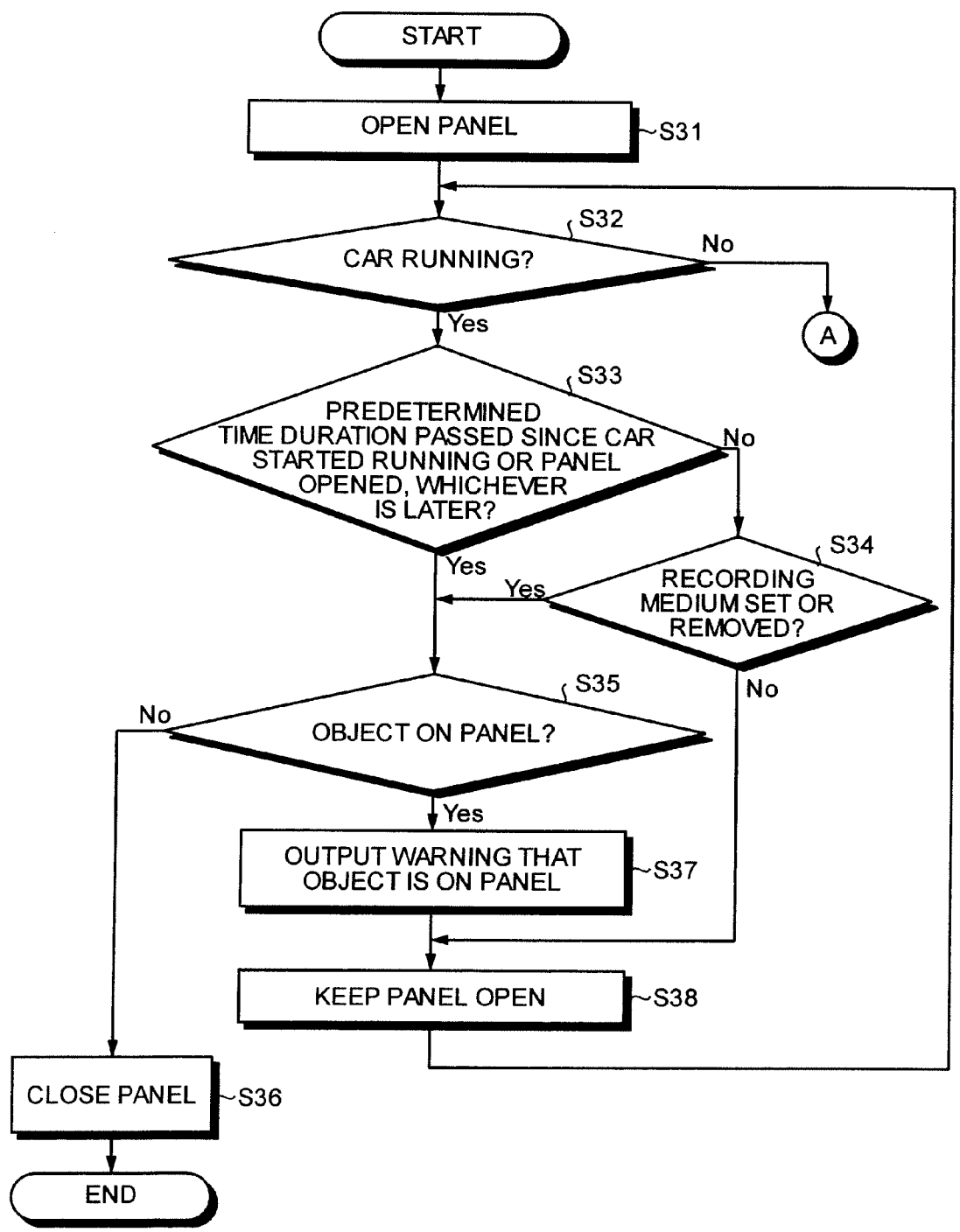
FIG. 7 is a flowchart of an example of an operation performed by the electric panel shown in FIG. 6.

FIG. 7 is a flowchart of an example of an operation performed by the electric panel. When a user inputs an instruction to open the panel 3 with the operation buttons 312, the driving section 23 opens the panel (step S31). Next, the control section 34 acquires car speed information from the speed detecting section 41, and determines whether the car installed with the electric panel (electronic device 1) is running (step S32). If not, the system control passes to step S12 in FIG. 5 of the first embodiment (denoted by "A" in FIGS. 5 and 7). If the car is running ("Yes" at step S32), it is determined whether a predetermined time duration has passed since the car started running or the panel 3 opened, whichever is later (step S33). If the predetermined time duration has not passed ("No" at step S33), the control section 34 determines whether a recording medium has been set in or removed from the playback device 21 (step S34). If a recording medium has been set in or removed from the playback device 21 ("Yes" at step S34), or if a predetermined time duration has passed ("Yes" at step S33), the control section 34 determines whether there is an object on the panel 3 based on a signal of the object detecting section 33 (step S35). If the control section 34 determines that there is no object on the panel 3 ("No" at step S35), the control section 34 instructs the driving section 23 to close the panel 3. The driving section 23 closes the panel 3 (step S36), and the processing ends.

When the control section 34 determines that there is an object on the panel 3 ("Yes" at step S35), the control section 34 outputs a signal to the warning output section 35, and the warning output section 35 outputs a warning signal with a sound or a visual effect to urge a user to remove the object (step S37). The control section 34 instructs the driving section 23 to keep the panel 3 open (step S38), the system control returns to steps S32, and repeats the above processing. When a recording medium has not been set in or removed from the playback device 21 ("No" at step S34), the panel 3 is kept open (step S38), the system control returns to step S32, and repeats the above processing.

The electronic device 1 according to the second embodiment can be installed not only in a car, but also in any movable body.

According to the second embodiment, even when the panel 3 has to close because the car is running, if an object is detected on the panel 3, a warning urges a user to remove the object. The panel 3 closes after the object is removed. This can prevent an object from falling off when the panel 3 closes. Furthermore, the panel 3 can be a safety hazard in a car collision, as it protrudes outside when open. A warning urges a user to close the panel 3, so that the hazard is eliminated beforehand.

Figure 8:
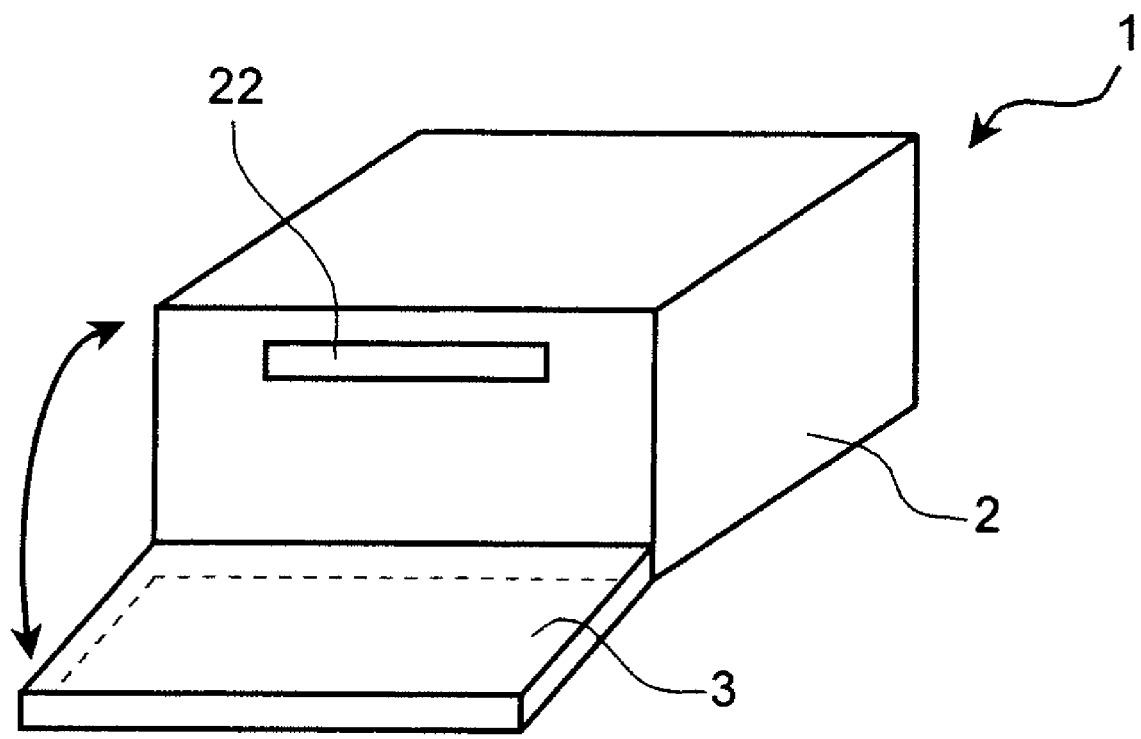
FIG. 8 is a perspective view of another electronic device according to the present invention.

The present invention is not limited to the first and the second embodiments in which the electric panel opens and closes as shown in FIGS. 1A to 1C. The present invention is applicable to any electric panel on which an object can be placed when the panel is open. For example, even if the panel does not open completely horizontally, but at a predetermined angle with a horizontal surface, the present invention is applicable as long as an object can be placed on the panel surface. FIG. 8 is a perspective view of another electronic device 1 to which the present invention is applicable. The panel 3 is attached to the bottom edge of the front side of the device body 2 by a shaft (not shown), and pivots on the shaft in a direction shown by an arrow to open and close.

According to the present invention, an object left on the panel 3 is prevented from falling off, a user is prevented from leaving objects on the panel 3, and the panel 3 can be prevented from being a safety hazard in case of an accident.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An electronic device comprising:
    a panel of the electronic device, the panel being provided on a front surface of the electronic device, wherein the panel is capable of moving between an open position and a close position;
    a driver that drives the panel between the open position and the close position;
    an object detector that detects whether there is an object on the panel; and
    a controller that controls the driver not to drive the panel from the open position when the object detector detects the object on a side of the panel, wherein
    the side of the panel faces frontward and covers the front surface of the electronic device when the panel is at the close position and faces upward when the panel is at the open position.

2. The electronic device according to claim 1, further comprising a warning output unit that outputs a warning that there is an object on the panel when the object detector detects the object on the side of the panel.

3. The electronic device according to claim 1, wherein the object detector is a resistance-pressure-sensitive touch sensor.

4. The electronic device according to claim 3, wherein the resistance-pressure-sensitive touch sensor includes
    an upper layer and a lower layer that are horizontally laid on the panel, wherein the upper layer is pressed against the lower layer by a weight of an object on the panel;
    a voltage applying unit that applies voltages to the upper layer and the lower layer; and
    a detecting unit that detects whether the upper layer touches the lower layer based on resistivity of the upper layer touching the lower layer.

5. The electronic device according to claim 1, wherein the object detector is a light-position-detecting touch sensor.

6. The electronic device according to claim 5, wherein the light-position-detecting touch sensor includes a frame that is set on the panel, and light-emitting elements and light-sensitive elements arranged at opposing positions along opposing sides of the frame, wherein the light-sensitive elements receives light constantly emitted from the light emitting elements, wherein the light is blocked when an object is on the panel.

7. The electronic device according to claim 4, wherein operation buttons used to operate the electronic device and a display unit are provided on the side of the panel, wherein the object detector is a touch panel that includes the operation buttons and the display unit.

8. An electronic device comprising:
    a panel of the electronic device that is installed in a movable body, wherein the panel is capable of moving between an open position and a close position;
    a driver that drives the panel between the open position and the close position;
    an object detector that detects whether there is an object on the panel;
    a speed acquiring unit that acquires a speed of the movable body; and
    a controller that controls
        the driver to drive the panel to the close position when the object detector does not detect an object on the panel and the speed acquired by the speed acquiring unit is higher than a predetermined speed, and
        wherein the driver does not drive the panel from the open position when the object detector detects an object on the panel, even when the speed acquired by the speed acquiring unit is higher than the predetermined speed.

9. The electronic device according to claim 8, further comprising a warning output unit that outputs a warning that there is an object on the panel when the object detector detects the object on the panel.

10. The electronic device according to claim 8, wherein the object detector is a resistance-pressure-sensitive touch sensor.

11. The electronic device according to claim 10, wherein the resistance-pressure-sensitive touch sensor includes
    an upper layer and a lower layer that are horizontally laid on the panel, wherein the upper layer is pressed against the lower layer by a weight of an object on the panel;
    a voltage applying unit that applies voltages to the upper layer and the lower layer; and
    a detecting unit that detects whether the upper layer touches the lower layer based on resistivity of the upper layer touching the lower layer.

12. The electronic device according to claim 8, wherein the object detector is a light-position-detecting touch sensor.

13. The electronic device according to claim 12, wherein the light-position-detecting touch sensor includes a frame that is set on the panel, and light-emitting elements and light-sensitive elements arranged at opposing positions along opposing sides of the frame, wherein the light-sensitive elements receives light constantly emitted from the light emitting elements, wherein the light is blocked when an object is on the panel.

14. The electronic device according to claim 10, wherein operation buttons used to operate the electronic device and a display unit are provided on a side of the panel that faces frontward when the panel is at the close position and upward when the panel is at the open position, wherein the object detector is a touch panel that includes the operation buttons and the display unit.

* * * * *